(12) United States Patent
Watson

(10) Patent No.: US 7,520,291 B2
(45) Date of Patent: Apr. 21, 2009

(54) PRESSURE-COMPENSATED, SUBSEA CHEMICAL INJECTION VALVE

(75) Inventor: Richard R. Watson, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 269 days.

(21) Appl. No.: 11/561,584

(22) Filed: Nov. 20, 2006

(65) Prior Publication Data

US 2008/0115842 A1    May 22, 2008

(51) Int. Cl.
*F16K 17/36*    (2006.01)
(52) U.S. Cl. .................. 137/81.2; 137/78.5; 137/494; 251/176
(58) Field of Classification Search ............. 137/78.5, 137/81.1, 81.2, 512.3, 493, 494, 509, 538; 251/176
See application file for complete search history.

(56) References Cited

U.S. PATENT DOCUMENTS

| | | | | | |
|---|---|---|---|---|---|
| 818,411 | A | * | 4/1906 | Bush | 137/538 |
| 2,234,932 | A | * | 3/1941 | Schlaupitz | 137/538 |
| 2,474,772 | A | * | 6/1949 | Ashton | 137/509 |
| 2,772,695 | A | * | 12/1956 | Harrison | 251/176 |
| 2,904,066 | A | * | 9/1959 | Freeman | 137/493 |
| 3,027,913 | A | * | 4/1962 | Chatham et al. | 137/484.2 |
| 3,601,149 | A | * | 8/1971 | Gilmore | 137/484 |
| 3,663,124 | A | * | 5/1972 | Schultz | 137/493 |
| 3,917,220 | A | * | 11/1975 | Gilmore | 251/176 |
| 4,456,028 | A | | 6/1984 | Watson | |
| 4,493,335 | A | * | 1/1985 | Watson | 137/116.3 |
| 5,782,269 | A | * | 7/1998 | Seaney et al. | 137/512.3 |
| 6,571,822 | B2 | * | 6/2003 | Neugebauer et al. | 137/538 |
| 6,651,696 | B2 | * | 11/2003 | Hope et al. | 137/494 |

OTHER PUBLICATIONS

"Combined Search and Examination Report under Sections 17 and 18(3)" dated Nov. 26, 2007 received in corresponding European application No. GB0721393.7.

* cited by examiner

*Primary Examiner*—Stephen M Hepperle
*Assistant Examiner*—Craig Price
(74) *Attorney, Agent, or Firm*—Wong, Cabello, Lutsch, Rutherford & Brucculeri, LLP

(57) ABSTRACT

A backpressure-protected valve suitable for subsea well treatment chemical injection applications includes an improved gate valve, a check valve and a pressure compensator responsive to ambient hydrostatic pressure. The check valve may comprise a poppet valve in a detachable outlet body. The pressure compensator comprises a free piston in a cylinder. The portion of the cylinder on one side of the piston is exposed to seawater whereas the portion of the cylinder on the opposing side of the piston is filled with a selected hydraulic fluid. In this way the valve actuator is not exposed to the corrosive and/or contaminating effects of seawater.

17 Claims, 2 Drawing Sheets

PRESSURE-COMPENSATED, SUBSEA CHEMICAL INJECTION VALVE

CROSS-REFERENCE TO RELATED APPLICATIONS

None

STATEMENT REGARDING FEDERALLY SPONSORED RESEARCH OR DEVELOPMENT

None

BACKGROUND OF THE INVENTION

1. Field of the Invention

This invention relates to valves. More particularly, it relates to pressure-compensated valves adapted for use in the subsea environment.

2. Description of the Related Art

U.S. Pat. No. 4,456,028 discloses a relief gate valve that comprises a hollow body having an inlet and an outlet, a seat ring in the outlet having a face adapted to engage a gate, a closure mounted for movement relative to the seat ring and including a carrier having a passage therethrough in which are slidably disposed a lipped gate disc adapted to engage the seat face and block the outlet when the valve is in closed position, a pressure spring pressing the gate disc against the seat face when the valve is in closed position, and a ball transferring the reaction of the spring to the body. The closure further includes a stem extending into a port through the body, a plate engaging the tip of the stem, a helical spring engaging the plate, and a screw cap encompassing the length of the spring and engaging a threaded cuff extending from the body. The cap bears on the spring at its end opposite from that which engages the plate, the helical spring urging the valve closure to a closed position in which a shoulder on the closure engages the seat ring, providing a travel limit stop, and retaining the closure in the body. An outlet part secured to the body over the outlet retains the seat ring in the body.

The valve described in U.S. Pat. No. 4,456,028 is not suitable for use in the subsea environment. It requires manual adjustment for setting the opening pressure and does not compensate for the hydrostatic pressure. Moreover, it has no means for preventing backflow through the valve if, for any reason, the outlet pressure exceeds the inlet pressure. The present invention solves these problems.

BRIEF SUMMARY OF THE INVENTION

A relief gate valve includes a body having an axial passage, one end of which forms the valve inlet, and a lateral passage transecting the axial passage, the outer end of the lateral passage forming the valve outlet. A check valve is positioned within the lateral passage for preventing backflow of fluid through the valve. In one preferred embodiment, the check valve comprise a poppet valve. The inner end of the lateral passage may be provided with a replaceable valve seat.

A valve actuator moves axially in the axial passage parallel to the face of the valve seat. The actuator includes a carrier peripherally spaced from the walls of the axial passage and having an axial stem passing through a stem port in the body at the end of the axial passage opposite from the inlet. The stem makes a sliding fit with the port to guide the actuator as it moves axially.

The stem extends from the main body part into a pressure compensator which engages a threaded stub extending from the main valve body.

One side of a bearing plate rests on the outer end of the stem and the other side of the bearing plate may be engaged by one or more elastic members which, in one preferred embodiment, are helical compression load springs. A threaded cap retains the other end of the load springs and additionally comprises an axial cylinder with a free piston. One side of the piston is in fluid communication with the environment via an orifice and is therefore subject to ambient pressure. The other side of the piston is exposed to a fluid-filled cavity within the body of the pressure compensator. The stem of the valve actuator is also in fluid communication with this cavity such that the ambient pressure may act on the cross-sectional area of the stem, urging it towards the closed position. Thus, both hydraulic and mechanical forces are brought to bear on the stem.

The carrier may be provided with a transverse, generally cylindrical cavity within which may be disposed an elastic member such as a helical pressure spring that is coaxial with the cavity. The spring bears at one end against the terminus of the cavity and, at the other end, presses against a seal disc or gate which engages the valve seat in a sliding arrangement.

The valve seat protrudes into the axial passage and engages a shoulder on the carrier to limit axial travel of the carrier in the direction of extension of the load spring(s), whereby the seal disc may be normally positioned over the valve seat to prevent flow through the lateral passage. Sufficient fluid pressure at the valve inlet, however, will cause the carrier to move in a direction which compresses the load spring(s), thereby unseating the seal disc and opening the valve.

To facilitate manufacture and to enable easy replacement of the valve seat, the body may be made in three parts including a main part, an outlet part and a pressure compensation part, the parts being held together by threaded engagement.

BRIEF DESCRIPTION OF THE DRAWING(S)

DETAILED DESCRIPTION OF THE INVENTION

Figure 1:
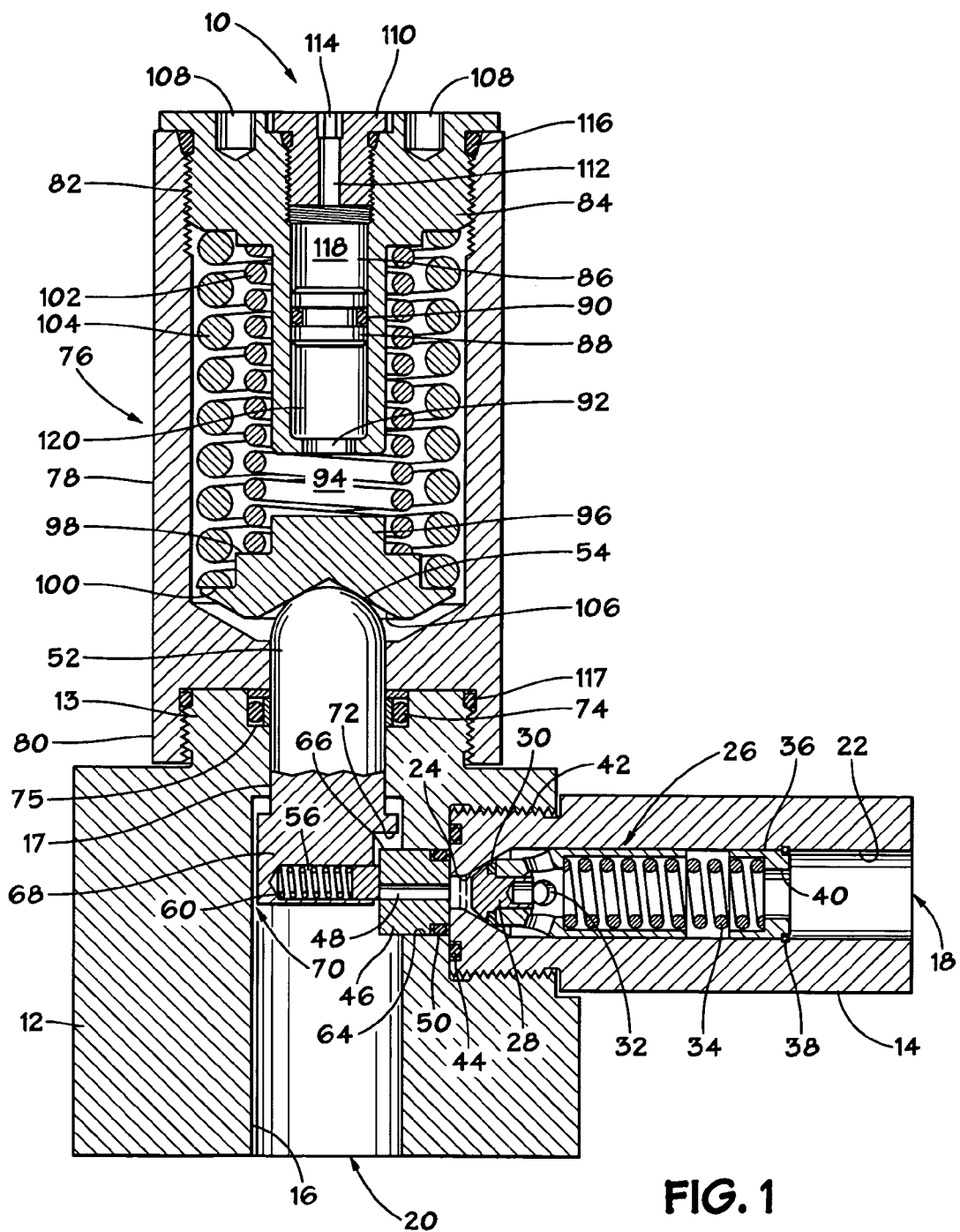
FIG. 1 is a cross-sectional view of a valve according to one embodiment of the invention.

Referring now to the drawings and more particularly to FIG. 1, there is shown a valve 10 comprising a main body part 12, an outlet body part 14 and a pressure compensator 76. The three body parts may be generally rectangular parallelepipeds secured together by threaded engagement. Seal 44 which may be an O-ring seal received in an annular groove 45 in one side of body part 14 seals with the adjacent side of body part 12.

A cylindrical bore provides an axial passage 16 in body part 12. The passage has an inlet 20 at one end which may be adapted to make a connection with a pipe or other conduit leading to a fluid reservoir or line whose pressure may be limited by valve 10.

A cylindrical bore 22 in the outlet part 14 of valve 10 provides a lateral passage in the body. This passage at its outer end provides an outlet 18 which, by way of example, may be adapted to make a fluid connection with a conduit leading to a subsea well. The passage further includes transverse cylindrical bore 64 in main body part 12. A cylindrical seat ring 46 received in bore 64 provides a valve seat. Seat ring 46 has a passage 48 extending axially therethrough. Bore 64 may be of larger diameter than bore 22. Seat ring 46 abuts against the shoulder 51 formed at the juncture of bores 22 and 64. When it is desired to replace seat ring 46, body part 14 may be removed and seat ring 46 may be pulled out. By the reverse procedure a new seat ring can be installed. A seal 50 which may be an elastomeric O-ring received in an annular groove around the seat ring seals between and among seat ring 46, bore 64 and the adjoining face of check valve body 14. This seal arrangement is an improvement over that employed in the valve disclosed in U.S. Pat. No. 4,456,028 which provides a seal only between the seat ring and the bore which contains the seat ring. A seal according to the present invention presents less opportunity for leakage of fluid from the valve to the environment.

The inner end of seat ring 46 protrudes into axial bore 16 in the main body part and its upper edge 66 provides a mechanical stop for positioning valve actuator 68. The inner face 62 of seat ring 46 may be planar and adapted to seal with gate or seal disc 58 of the valve actuator.

Figure 2:
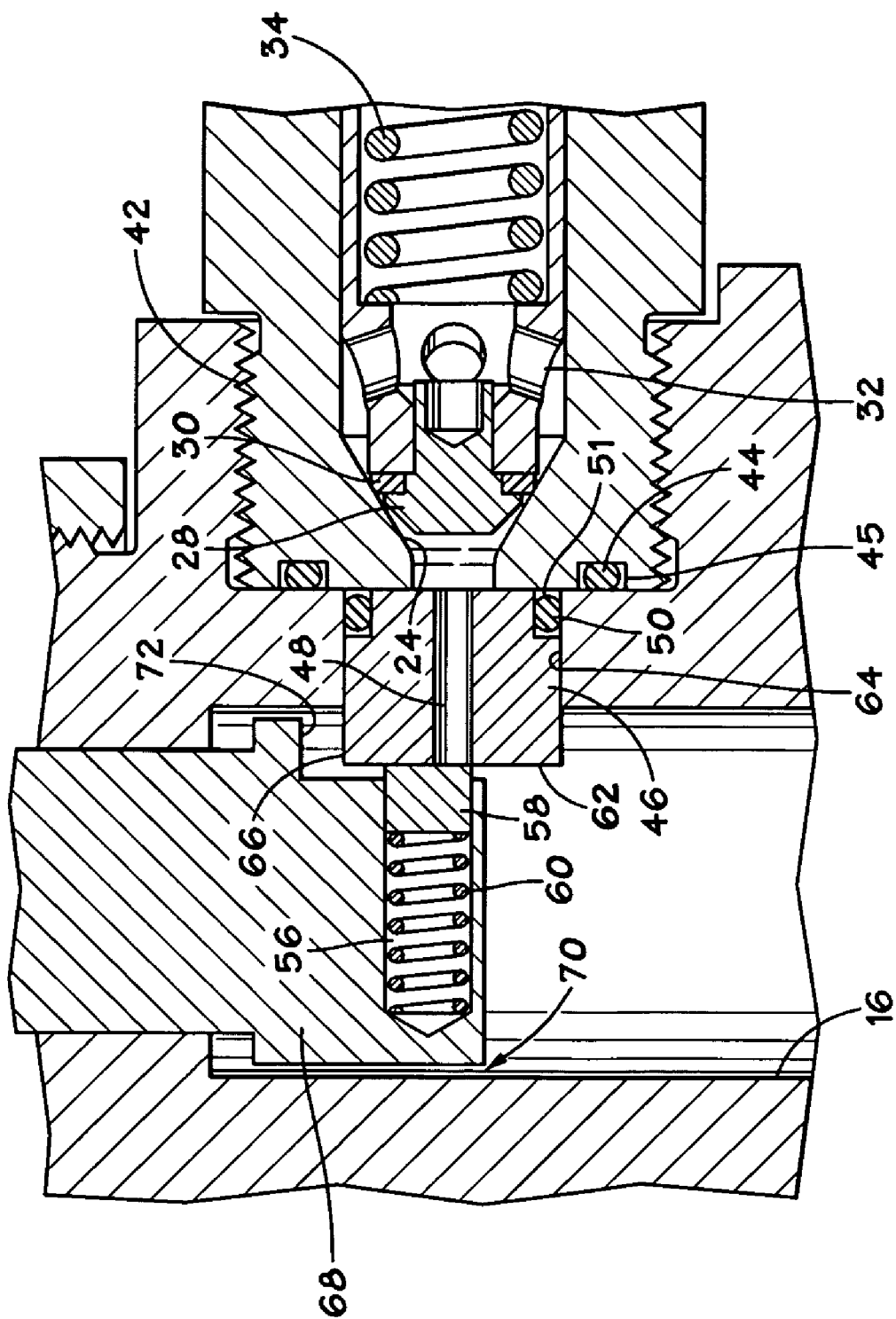
FIG. 2 is an enlarged view of the gate portion of the valve illustrated in FIG. 1.

Valve actuator 68 may be generally cylindrical but of smaller diameter than bore 16 thereby providing annulus 70 (FIG. 2) for the flow of fluid from inlet 20 through passage 48 and poppet 26 to outlet 18. A blind hole or cavity 56 is provided in one side of actuator 68. Hole or cavity 56 may be generally cylindrical. In the illustrated embodiment, helical pressure spring 60, disposed within cavity 56 bears at one end against the closed end of cavity 56 and at the other end against gate or seal disc 58 and may be slightly compressed when assembled in the valve. The pressure of the axially compressed spring presses disc 58 against face 62 of seat ring 46. The gate may be a cylindrical disc which extends around and overlaps the periphery of passage 48 in the seat ring, sealing off the passage as long as the disc and seat ring are coaxial. This design is an improvement over the ball-and-spring mechanism used in the valve disclosed in U.S. Pat. No. 4,456, 028. The parts count is reduced and a stronger and more reliable shear seal is provided. The elimination of the ball element renders a valve according to the present invention less susceptible to a malfunction due to fluid contamination or the scoring, pitting or corrosion of the wall of bore 16.

The outer diameter of disc 58 may be slightly smaller than the inner diameter of blind hole 56 so that the disc 58 can slide freely in the cavity and can cant slightly to ensure that it is coplanar with seat ring face 62. The force of pressure spring 60 may be very small, being of the order of magnitude of one ounce in a preferred embodiment, so that the gate-seat friction due to the force of the pressure spring 60 may be negligible compared to that generated by the pressure of fluid against the gate. In certain chemical injection applications the fluid pressure may be as high as 30,000 psi. In those situations, inlet fluid pressure acting over the cross sectional area of passage 48, may exert a force of up to several thousand pounds on the gate of valve 10.

In the illustrated embodiment, outlet body 14 has threaded nose section 42 for engaging a corresponding socket in the side of main body 12. The face of nose section 42 may be provided with annular groove 45 for retaining seal 44 which may be an elastomeric O-ring in certain embodiments. Outlet body 14 comprises central axial bore 22 the distal portion of which is fluid outlet 18. The opposing end of bore 22 has a reduced diameter and the transition between the two regions is in the form of frusto-conical section 24. Poppet valve 26 fits within bore 22 in sealing engagement with conical seat 24. Poppet valve 26 comprises end piece 36 having central passage 40, nose piece 28 having seal 30 having openings 32 and spring 34 which bears against end piece 36 and urges nose piece 28 into sealing engagement with surface 24. End piece 36 is held in bore 22 by retainer 38 which may be a snap ring or the like.

This design provides for easy replacement, refurbishment or repair of the check valve. Outlet body 14 may simply be unscrewed from main body 12 thereby providing access to poppet valve 26 including seal 30 which, in certain embodiments, may be a replaceable seal.

If the fluid pressure at inlet 20 exceeds that at outlet 18, when valve 10 opens, fluid pressure acts against nose piece 28, compressing spring 34 which moves seal 30 away from surface 24. Fluid may then flow through openings 32 in nose piece 28, through the axial channel surrounded by spring 34 and out through passage 40. However, if the fluid pressure at outlet 18 exceeds the fluid pressure at inlet 20, both spring 34 and the fluid pressure act to urge seal 30 against surface 24, preventing the backflow of fluid through valve 10. In this way poppet 26 acts as a check valve and ensures that fluid only flows through valve 10 in the intended direction. Spring 34 may be selected so as to provide a minimum pressure differential between inlet 20 and outlet 18 that will act to open poppet valve 26.

A valve stem 52 extends coaxially from actuator 68 away from inlet 20 into reduced diameter portion 17 of cylindrical bore 16. An O-ring 74 in a circumferential groove 75 seals the stem to the body of bore 16. The stem may be of larger diameter than seat ring passage 48, i.e., the cross section of stem 52 may be larger than the area of seal disc 58 exposed to the differential of inlet and outlet pressure. Therefore, the force of the fluid pressure tending to move actuator 68 toward stem bore 16 may be greater than the fluid force tending to hold the seal disc against its seat. Since the frictional force created between the gate and seat by the normal force therebetween may be only a small percentage of the normal force, it will be appreciated that variations in the frictional force due to variation in outlet pressure will be reduced compared with the situation if the valve stem diameter were smaller than the diameter of bore 48.

Generally cylindrical stub 13 which may have external straight threads projects from main body 12. Pressure compensator 76 may have skirt 80 with corresponding interior threads such that it may be screwed onto stub 13. Seal 117, which may be an elastomeric seal, prevents leakage of hydraulic fluid from the interior of pressure compensator 76 from the threaded connection to main body 12 at stub 13.

In the illustrated embodiment, pressure compensator 76 comprises a central axial chamber within which is disposed concentric helical compression load springs 102 and 104. The upper ends of the load springs bear against threaded cap 84 which is retained in the central bore of pressure compensator 76 by engagement with threaded portion 82. Tool receiver sockets 108 may be provided in the exposed end surface of cap 84 for engaging a spanner. Seal 116 provides a fluid-tight seal between cap 84 and body 78.

The lower ends of load springs 102 and 104 bear against generally circular bearing plate 96 having inner and outer shoulders 98 and 100, respectively. Bearing 96 may have a conical socket 106 on its distal face for contacting hemispherical end 54 of stem 52.

Cap 84 comprises cylinder 86 which may be formed by a central, axial bore. Piston 88 partitions cylinder 86 into chambers 118 and 120. Plug 110 may be pressed or threaded into the exposed opening of chamber 118. Plug 110 may comprise orifice 114 in fluid communication with central axial passage 112 and chamber 118 such that one side of free-floating piston 88 in cylinder 86 may be normally exposed to ambient pressure. Piston 88 comprises ring seal 90 which seals against the walls of cylinder 86.

Load springs 102 and 104 act to push stem 52 into main body part 12 (downward in FIG. 1) until shoulder 72 on actuator 68 rests on upper edge 66 of the inner end of seat ring 46 which protrudes into passage 16. In this position seal disc 58 may be coaxial with seat ring passage 48 and the valve is closed. If the inlet pressure rises sufficiently to overcome the combined force of springs 102 and 104, the ambient pressure and the gate-seat friction, the actuator 68 moves such that stem 52 extends farther out of main body part 12. This action compresses the load spring(s), expels fluid in chamber 94 through opening 92 into chamber 120 (displacing piston 88), and the gate seat disc 58 moves away from coaxial alignment with seat ring passage 48 thereby opening the valve.

A reduction in inlet pressure will allow the load springs and the ambient pressure due to the hydrostatic head acting on stem 52 to return the valve to the closed position wherein passage 48 is blocked by seal disk 58.

The valve construction may be such that the carrier retains the spring and seal disc as long as the carrier is in the body. The actuator may be inserted in the body before the load spring is compressed and before the outlet part of the body and seat ring are assembled. Once the seat ring is in place and the outlet part of the body is secured to the main part, the carrier may be locked in the body by the seat ring and the seat ring may be captured between the carrier and the outlet part of the body.

Although the invention has been described in detail with reference to certain preferred embodiments, variations and modifications exist within the scope of the invention as described and defined in the following claims.

What is claimed is:

1. A gate valve comprising:
   a body having an axial passage and a lateral passage intersecting the axial passage, the outer ends of the axial and lateral passages providing an inlet and outlet respectively, the inner end of the lateral passage providing a valve seat;
   a valve actuator axially movable in the axial passage between a valve closed position blocking flow through the lateral passage and a valve open position in which fluid flow through the lateral passage is possible;
   the valve actuator including a transverse blind hole open on a side adjacent the lateral passage, a gate transversly movable and at least partially within the blind hole and adapted to block the lateral passage in the valve closed position and a pressure spring in the blind hole urging the gate against the valve seat;
   the valve actuator further including an axial stem extending from the axial passage on the end opposite the valve inlet; and,
   a pressure compensator responsive to ambient pressure which applies a force to the stem in a direction that tends to move the valve actuator to the valve closed position such that an increase in ambient pressure results in a greater applied force to the stem, the pressure compensator comprising
      a first fluid-filled chamber said first fluid-filled chamber having an opening which slidably engages the stem of the valve actuator in a fluid-tight relation;
      a second chamber open to the ambient environment;
      a free piston slidably disposed within a cylinder, the cylinder being open on a first end to the first chamber and open on a second end to the second chamber such that an increase in ambient pressure effects an increase in the fluid pressure of the first fluid-filled chamber and movement of the valve actuator to the valve open position causes a movement of the piston which effects a decrease in the volume of the second chamber.

2. A valve as recited in claim 1 wherein the pressure compensator comprises a spring disposed within the pressure compensator such that the spring applies a substantially constant force to the stem.

3. A valve as recited in claim 1 wherein the pressure compensator comprises a plurality of springs disposed within the pressure compensator such that the plurality of springs collectively applies a substantially constant force to the stem.

4. A valve as recited in claim 3 wherein the plurality of springs are concentrically disposed within the pressure compensator.

5. A valve as recited in claim 1 wherein the pressure compensator additionally comprises a spring disposed within the pressure compensator such that the spring applies a substantially constant force to the stem.

6. A valve as recited in claim 1 wherein the pressure compensator additionally comprises a plurality of springs concentrically disposed within the pressure compensator such that the plurality of springs collectively applies a substantially constant force to the stem.

7. A gate valve comprising:
   a body having an axial passage and a lateral passage intersecting the axial passage, the outer ends of the axial and lateral passages providing an inlet and outlet respectively, the inner end of the lateral passage providing a valve seat;
   a check valve in the lateral passage responsive to fluid pressure such that the check valve moves to an open position if fluid pressure at the inlet exceeds fluid pressure at the outlet by a pre-selected amount and moves to a closed position if fluid pressure at the outlet exceeds fluid pressure at the inlet;
   a valve actuator axially movable in the axial passage between a valve closed position blocking flow through the lateral passage and a valve open position in which fluid flow through the lateral passage is possible;
   the valve actuator including a transverse blind hole open on a side adjacent the lateral passage, a gate transversly movable and at least partially within the blind hole and adapted to block the lateral passage in the valve closed position and a pressure spring in the blind hole urging the gate against the valve seat;
   the valve actuator further including an axial stem extending from the axial passage on the end opposite the valve inlet; and,
   a pressure compensator responsive to ambient pressure which applies a force to the stem in a direction that tends to move the valve actuator to the valve closed position such that an increase in ambient pressure results in a greater applied force to the stem, the pressure compensator comprising
      a first fluid-filled chamber said first fluid-filled chamber having an opening which slidably engages the stem of the valve actuator in a fluid-tight relation;
      a second chamber open to the ambient environment;
      a free piston slidably disposed within a cylinder, the cylinder being open on a first end to the first chamber and open on a second end to the second chamber such that an increase in ambient pressure effects an increase in the fluid pressure of the first fluid-filled chamber and movement of the valve actuator to the valve open position causes a movement of the piston which effects a decrease in the volume of the second chamber.

8. A gate valve as recited in claim 7 wherein the check valve is a poppet valve.

9. A gate valve as recited in claim 8 wherein the poppet valve is a spring-loaded poppet valve.

10. A gate valve as recited in claim 9 wherein the pre-selected amount of excess inlet pressure required to open the check valve is adjusted by selecting the spring strength.

11. A gate valve as recited in claim 9 wherein the pre-selected amount of excess inlet pressure required to open the check valve may be adjusted by varying the pre-load on the spring.

12. A gate valve as recited in claim 8 wherein the lateral passage comprises a frusto-conical section that functions as the seat of the poppet valve.

13. A gate valve comprising:
   a first body having an axial passage and a lateral passage intersecting the axial passage, the outer end of the axial passage providing an inlet, the inner end of the lateral passage providing a valve seat;
   a second body having a central passage for fluid flow, the passage having a first end and a second end, the first end adapted for removable engagement with the first body such that the central passage of the second body is in fluid communication with the lateral passage of the first body, the second end of the axial passage providing an outlet;
   a check valve in the lateral passage of the second body responsive to fluid pressure such that the check valve moves to an open position if fluid pressure at the inlet exceeds fluid pressure at the outlet by a pre-selected amount and moves to a closed position if fluid pressure at the outlet exceeds fluid pressure at the inlet;
   a valve actuator axially movable in the axial passage of the first body between a valve closed position wherein flow through the lateral passage is blocked and a valve open position in which fluid flow through the lateral passage is possible;
   the valve actuator including a transverse blind hole open on a side adjacent the lateral passage, a gate transversly movable and at least partially within the blind hole and adapted to block the lateral passage in the valve closed position and a pressure spring in the blind hole urging the gate against the valve seat;
   the valve actuator further including an axial stem extending from the axial passage on the end opposite the valve inlet; and,
   a third body adapted for removable engagement with the first body, the third body housing a pressure compensator responsive to ambient pressure which applies a force to the stem in a direction that tends to move the valve actuator to the valve closed position such that an increase in ambient pressure results in a greater applied force to the stem, the pressure compensator comprising
      a first fluid-filled chamber said first fluid-filled chamber having an opening which slidably engages the stem of the valve actuator in a fluid-tight relation;
      a second chamber open to the ambient environment;
      a free piston slidably disposed within a cylinder, the cylinder being open on a first end to the first chamber and open on a second end to the second chamber such that an increase in ambient pressure effects an increase in the fluid pressure of the first fluid-filled chamber and movement of the valve actuator to the valve open position causes a movement of the piston which effects a decrease in the volume of the second chamber.

14. A valve as recited in claim 13 further comprising a threaded projection on the first body for engaging the third body.

15. A valve as recited in claim 13 further comprising a threaded socket on the first body for engaging the second body.

16. A valve as recited in claim 13 wherein the pressure compensator additionally comprises a spring disposed within the pressure compensator such that the spring applies a substantially constant force to the stem.

17. A valve as recited in claim 13 wherein the pressure compensator additionally comprises a plurality of springs concentrically disposed within the pressure compensator such that the plurality of springs collectively applies a substantially constant force to the stem.

* * * * *